Sept. 25, 1962     H. H. COFFIN     3,055,714
DIE SET BEARING

Filed Nov. 17, 1960     2 Sheets-Sheet 1

INVENTOR.
HARLAND H. COFFIN
BY
ATTORNEY

Sept. 25, 1962
H. H. COFFIN
3,055,714
DIE SET BEARING
Filed Nov. 17, 1960
2 Sheets-Sheet 2
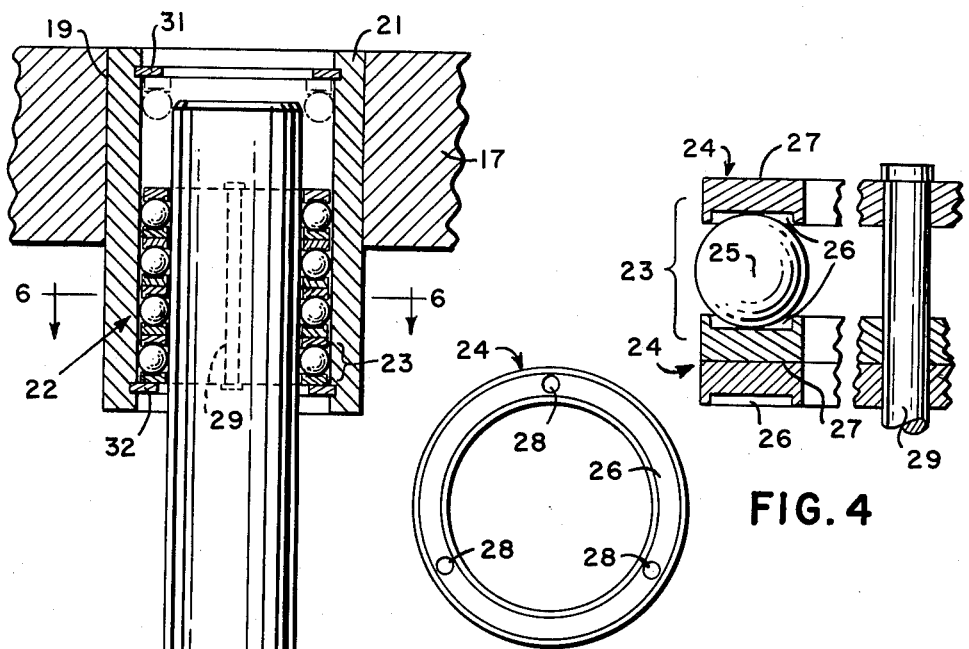
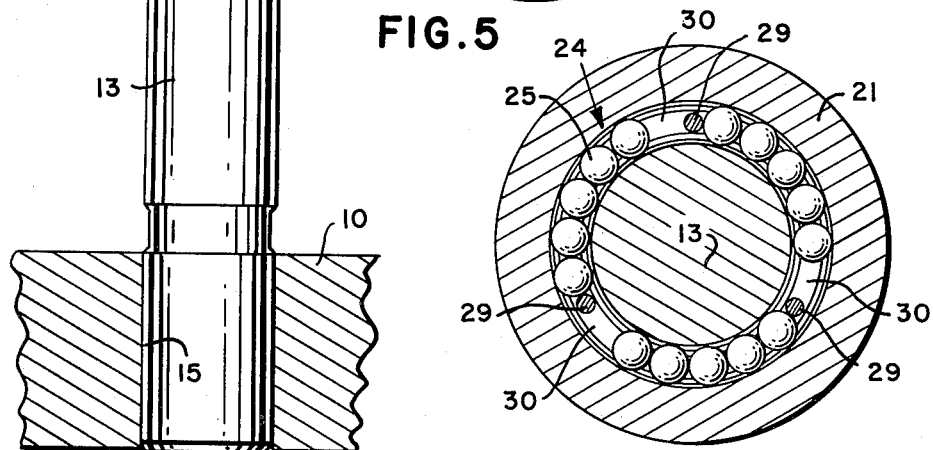
FIG. 3
FIG. 6
INVENTOR.
HARLAND H. COFFIN
BY
ATTORNEY

3,055,714
DIE SET BEARING

Harland H. Coffin, Bridgeport, Conn., assignor to Producto Machine Company, Bridgeport, Conn., a corporation of Connecticut
Filed Nov. 17, 1960, Ser. No. 69,892
6 Claims. (Cl. 308—6)

The present invention relates to bearings, and particularly to a new and improved ball bearing for use between mating stud and sleeve means that are adapted to be reciprocated relative to each other, and to a method of making the same.

Although the bearing of this invention has application in any structure involving mating, reciprocating male and female members, it will be shown and described as applied to a die set for a forming press and the like.

Preloaded anti-friction bearings have previously been employed between the sleeves and studs of die sets. Difficulties, however, have been experienced in the manufacture and use of such bearings including the deterioration of the stud due to "tracking" of the balls in a ball bearing arrangement; and, the excessive cost of manufacture because prior known designs required different manufacturing methods and tooling to provide the necessary inventory for different capacity die sets.

The principal object of this invention is to provide a die set having preloaded ball bearings between the sleeve and stud thereof which will not "track" on the stud.

Another object of this invention is to provide such a die set in which the preloaded ball bearings are arranged so that the balls thereof are permitted random orbital movement relative to each other.

Still another object of the invention is to provide an anti-friction bearing for a die set in which common parts are employed to fabricate bearings for different capacity die sets.

In one aspect of the invention, the anti-friction bearing may be made up of units composed of identical race members of annular form having annular grooves in one face thereof. A unit bearing may be formed by locating two of such race members in coaxial relation with the annular grooves thereof facing each other.

In another aspect of the invention, balls may be located between the two race members and held therebetween in rolling contact with the bottom of the annular grooves in the race members by pins that may extend through the race members.

In still another aspect of the invention, the balls between the race members may be free of cage devices so that random movement of the balls between the race members may occur.

In still another aspect of the invention, bearings for die sets of different capacities may be formed by assembling any number of unit bearings in coaxial arrangement and inserting pins completely through the assembled or stacked annular race members to provide a composite anti-friction bearing of any desired length.

The above, other objects and novel features of the die set bearing will become apparent from the following specification and accompanying drawings which are merely exemplary.

In the drawings:

FIG. 3 is an enlarged sectional elevational view taken substantially along line 3—3 of FIG. 2;

FIG. 4 is an enlarged sectional view of a detail of the invention;

FIG. 5 is a plan view of a bearing race employed in the bearing of the invention; and FIG. 6 is a sectional view taken substantially along line 6—6 of FIG. 3.

Figure 1:
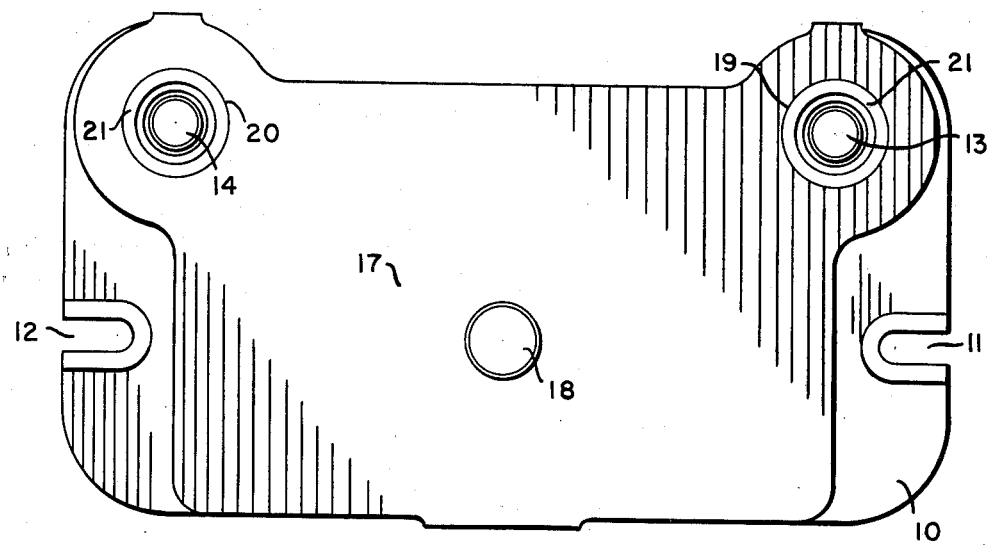
FIG. 1 is a top plan view of a die set to which the principles of the invention have been applied.
Figure 2:
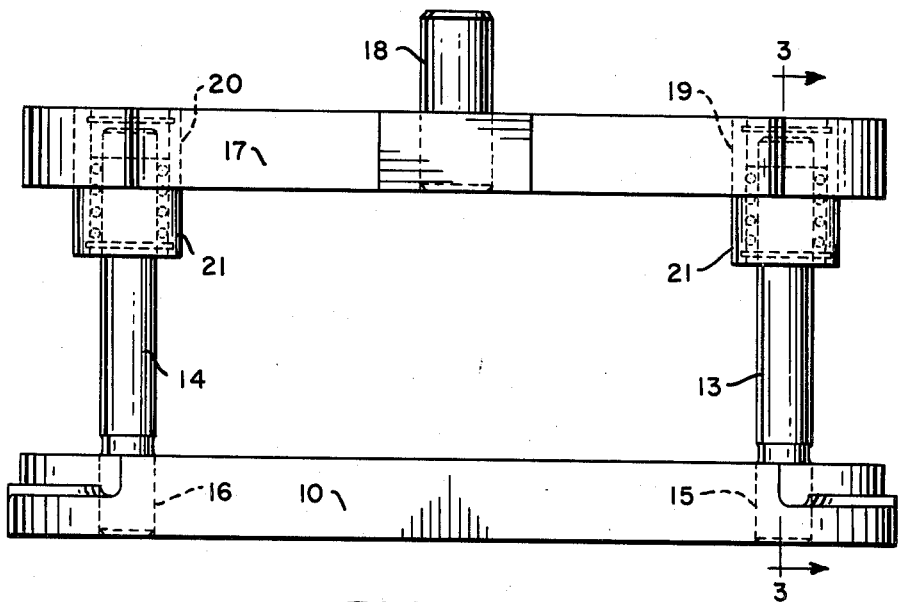
FIG. 2 is an elevational view of the die set shown in FIG. 1.

Referring to the drawings, and particularly to FIGS. 1 and 2, the principles of the invention are shown as applied to a die set including a bottom plate 10 having slots 11 and 12 for receiving fastening means adapted rigidly to hold the bottom plate 10 to a supporting structure. Two or more case-hardened studs 13 and 14 may be rigidly held in the plate 10 in parallel relation, usually by a press fit 15 and 16 within bores in base 10.

An upper plate 17 may be provided with a stud 18 for engagement with chuck jaws or the like of a reciprocating means (not shown) for supplying a working stroke to the plate 17 as is well known. The upper plate 17 may include two or more bores 19 and 20 equal to the number of studs 13 and 14 and spaced so as to register with studs 13 and 14 when plate 17 is located above plate 10 in the die press. Each bore 19, 20 is adapted to have pressed therein a case-hardened sleeve 21. The internal diameter of the sleeve 21 may be such as to receive between its internal surface and the external surface of stud 13, a ball bearing 22 under a preloaded condition.

The bearing 22 may comprise a plurality of ball bearing units 23 (FIGS. 3 and 4) made up of identical race elements 24 (FIG. 5) and a plurality of balls 25 therebetween. Each race element 24 may comprise an annular ring having an annular groove or track 26 in its one surface and may be provided with an opposed plain surface 27. Passages 28 may extend through the race elements 24 and they are shown in the embodiment disclosed as being approximately 120° apart and located within the groove or track 26. A unit 23 may comprise two race elements 24 arranged in opposed, axially aligned relation so that their annular grooves 26 face each other, and a number of balls 25 may be located between the races 24 which number is less than that to completely fill the annular grooves 26, providing sufficient space for the balls 25 to move about the race elements 24 at random and independently of each other. A bearing may comprise a stack of axially aligned units 23, and pins 29 may extend through the holes 28 and they may be headed at each end to hold the assembly together. The assembly 22, when mounted between the inner surface of sleeve 21 and the outer surface of pin 13, is not inhibited from turning about pin 13 during operation of the die set.

Referring to FIG. 6, the number of balls between the pins 29 is insufficient to fill the spaces therebetween, providing a space 30 within which the balls 25 may move at random about the tracks of races 24 independently of each other. The number of units 23 making up a bearing 22 may vary widely depending upon the desired stroke and load to be encountered in service. The length of the sleeve 21 is substantially greater than the length of the assembled bearing 22 and this length will, of course, depend upon the stroke of the press and the length of the assembled bearing 22. In order to retain the assembled bearing 22 within the sleeve 21, retainer rings 31 and 32 may be located within sleeve 21 at each end thereof.

With the above described construction, reciprocation of the top plate 17 will cause the balls 25 to roll between the outer surface of stud 13 and the inner surface of sleeve 21 under a preloaded condition, thereby maintaining precise alignment of the sleeve 21 and pin 13 and hence precise parallelism of the top plate 17 and bottom plate 10. Furthermore, by virtue of the spaces 30 and the absence of cages for the balls 25, they may at random move to different positions about the races 24 between pins 29, thereby preventing "tracking" of the balls on the pin 13.

In fact, continual use of the bearing arrangement of this invention (three million reciprocations) actually polishes the surface of pin 13 with no measurable wear. Finally, large inventories can be assured from a single track element which, of course, would be manufactured in different diameters.

Although the various features of the bearing for die presses have been shown and described in detail to fully disclose one embodiment of the invention, it will be evident that changes may be made in such details and certain features may be used without others without departing from the principles of the invention.

What is claimed is:

1. Apparatus comprising a stationary member; another member adapted to be moved toward and from said stationary member; guide pin means rigidly held by one member; mating guide means rigidly held by the other member in position for registering with said guide pin means during relative movement of said members; and a preloaded ball bearing assembly between said mating means and pin means, said assembly including a plurality of parallel stacked, identical race elements at right angles to said pin means, having annular track means and a number of balls between each of said track means, which number is less than that to completely fill said track means, and arranged to have random movement within the annular track means independently of the movement of all other balls therein, the axial length of said mating guide means being substantially greater than that of said ball bearing assembly, whereby upon reciprocation between said pin and guide means, said balls roll on the outer surface of said guide pin means and the inner surface of said mating guide means, and grooving of said guide pin means and said mating guide means is inhibited.

2. Apparatus comprising a stationary member; another member adapted to be moved toward and from said stationary member; guide pin means rigidly held by one member; mating guide means rigidly held by the other member in position for registering with said guide pin means during relative movement of said members; a preloaded ball bearing assembly between said mating means and pin means, said assembly including a plurality of parallel stacked, identical race elements at right angles to said pin means, having annular track means and a number of balls between each of said track means, which number is less than that to completely fill said track means, and arranged to have random movement within the annular track means independently of the movement of all other balls therein, the axial length of said mating guide means being substantially greater than that of said ball bearing assembly, whereby upon reciprocation between said pin and guide means, said balls roll on the outer surface of said guide pin means and the inner surface of said mating guide means, and grooving of said guide pin means and said mating guide means is inhibited; and means for retaining said bearing assembly between said mating means.

3. Apparatus comprising a stationary member; another member adapted to be moved toward and from said stationary member; guide pin means rigidly held by one member; mating guide means rigidly held by the other member in position for registering with said guide pin means during relative movement of said members; a preloaded ball bearing assembly between said mating means and pin means, said assembly including a plurality of parallel stacked, identical race elements at right angles to said pin means, having annular track means and a number of balls between each of said track means, which number is less than that to completely fill said track means, and arranged to have random movement within the annular track means independently of the movement of all other balls therein; and pins extending through the race elements for holding them in stacked assembled relation, the axial length of said mating guide means being substantially greater than that of said ball bearing assembly, whereby upon reciprocation between said pin and guide means, said balls roll on the outer surface of said guide pin means and the inner surface of said mating guide means, and grooving of said guide pin means and said mating guide means is inhibited.

4. Apparatus comprising a stationary member; another member adapted to be moved toward and from said stationary member; guide pin means rigidly held by one member; mating guide means rigidly held by the other member in position for registering with said guide pin means during relative movement of said members; and a preloaded ball bearing assembly between said mating means and pin means, said assembly including a plurality of parallel stacked, identical race elements at right angles to said pin means, having annular grooved track means on one surface facing each other and a flat surface opposite said grooved surface, and a number of balls between each of said track means, which number is less than that to completely fill said track means, and arranged to have random movement within the annular track means independently of the movement of all other balls therein, the axial length of said mating guide means being substantially greater than that of said ball bearing assembly, whereby upon reciprocation between said pin and guide means, said balls roll on the outer surface of said guide pin means and the inner surface of said mating guide means, and grooving of said guide pin means and said mating guide means is inhibited.

5. In a die set including a bottom plate and an upper plate, pin means rigidly held by one of said plates; sleeve means rigidly held by the other of said plates; and a preloaded ball bearing assembly between said sleeve and pin means, said assembly including a plurality of parallel stacked, identical race elements at right angles to said pin means, having annular track means and a number of balls between each of said track means, which number is less than that to completely fill said track means, and arranged to have random movement within the annular track means independently of the movement of all other balls therein, the axial length of said sleeve means being substantially greater than that of said ball bearing assembly, whereby upon reciprocation between said pin and sleeve means, said balls roll on the outer surface of said pin means and the inner surface of said sleeve means, and grooving of said pin means and said sleeve means is inhibited.

6. In a die set including a bottom plate and an upper plate, pin means rigidly held by one of said plates; sleeve means rigidly held by the other of said plates; a preloaded ball bearing assembly between said pin and sleeve means including a plurality of units each comprising oppositely disposed, identical race elements at right angles to said pin means, having annular grooved track means on one surface facing each other and a flat surface opposite said grooved surface, and a number of balls between each of said track means, which number is less than that to completely fill said track means, and arranged to have random movement within the annular track means independently of the movement of all other balls therein; pins extending through the grooved track means of said units to hold them in assembled relation; and retainer means at each end of said sleeve means, the axial length of said sleeve means being substantially greater than that of said ball bearing assembly, whereby upon reciprocation between said pin and sleeve means, said balls roll on the outer surface of said pin means and the inner surface of said sleeve means, and grooving of said pin means and said sleeve means is inhibited.

References Cited in the file of this patent

UNITED STATES PATENTS

| | | |
|---|---|---|
| 456,955 | Howard | Aug. 4, 1891 |
| 2,311,815 | Briney | Feb. 23, 1943 |
| 2,316,468 | Thomas | Apr. 13, 1943 |
| 2,422,774 | Conner | June 24, 1947 |